(12) United States Patent
Lee et al.

(10) Patent No.: US 10,295,031 B2
(45) Date of Patent: May 21, 2019

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Kyeong Hun Lee, Seoul (KR); Jong Soo Kim, Seoul (KR); Jong Sool Park, Hwaseong-si (KR); Dong Hwan Hwang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 60 days.

(21) Appl. No.: 15/642,760

(22) Filed: Jul. 6, 2017

(65) Prior Publication Data

US 2019/0011028 A1    Jan. 10, 2019

(51) Int. Cl.
*F16H 37/04* (2006.01)
*F16H 3/66* (2006.01)

(52) U.S. Cl.
CPC ............... *F16H 37/04* (2013.01); *F16H 3/66* (2013.01); *F16H 2037/048* (2013.01); *F16H 2200/0069* (2013.01); *F16H 2200/0073* (2013.01); *F16H 2200/2012* (2013.01); *F16H 2200/2048* (2013.01)

(58) Field of Classification Search
USPC ........................................................ 475/302
See application file for complete search history.

(56) References Cited

U.S. PATENT DOCUMENTS 6,984,187 B2 *  1/2006  Biermann ................. F16H 3/66
                                                    475/215
2018/0163824 A1 *  6/2018  Kim ........................ F16H 3/666

FOREIGN PATENT DOCUMENTS

KR    10-2011-0131817 A    12/2011

* cited by examiner

*Primary Examiner* — Dirk Wright
(74) *Attorney, Agent, or Firm* — Brinks Gilson & Lione (57) ABSTRACT

A planetary gear train of an automatic transmission for a vehicle is disclosed. The planetary gear train may include: a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; an input shaft, the first, second, and third planetary gear sets being disposed at a radial outer of the input shaft; and an output shaft disposed in parallel with the input shaft, the fourth planetary gear set being disposed at a radial outer of the outer shaft.

19 Claims, 6 Drawing Sheets

| | C1 | C2 | C3 | C4 | B1 | B2 | B3 | gear ratio | step ratio | note |
|---|---|---|---|---|---|---|---|---|---|---|
| D1 | ● | ● | | | | ● | | 5.585 | | |
| D2 | | ● | | ● | | ● | | 3.850 | 1.45 | |
| D3 | ● | | | ● | | ● | | 2.663 | 1.45 | gear ratio span |
| D4 | | | | ● | | ● | ● | 1.922 | 1.39 | : 9.0 |
| D5 | | | ● | ● | | ● | | 1.582 | 1.22 | |
| D6 | | | ● | ● | | | ● | 1.259 | 1.26 | ratio of R/D1 |
| D7 | ● | | ● | ● | | | | 0.996 | 1.26 | :0.73 |
| D8 | ● | | ● | | | | ● | 0.870 | 1.14 | |
| D9 | | ● | ● | | | | ● | 0.719 | 1.21 | |
| D10 | ● | ● | | | | | ● | 0.620 | 1.16 | |
| REV | ● | ● | | | ● | | | 4.079 | - | |

FIG. 3

| | C1 | C2 | C3 | C4 | B1 | B2 | B3 | gear ratio | step ratio | note |
|---|---|---|---|---|---|---|---|---|---|---|
| D1 | ● | ● | | | | ● | | 5.004 | 1.46 | gear ratio span : 9.6 ratio of R/D1 :0.86 |
| D2 | | ● | | ● | | ● | | 3.438 | 1.42 | |
| D3 | ● | | | ● | | ● | | 2.421 | 1.37 | |
| D4 | | | | ● | | ● | ● | 1.767 | 1.20 | |
| D5 | | | ● | ● | | ● | | 1.468 | 1.21 | |
| D6 | | | ● | ● | | | ● | 1.217 | 1.23 | |
| D7 | ● | | ● | ● | | | | 0.991 | 1.15 | |
| D8 | ● | | ● | | | | ● | 0.861 | 1.19 | |
| D9 | | ● | ● | | | | ● | 0.723 | 1.15 | |
| D10 | ● | ● | | | | | ● | 0.629 | 1.20 | |
| D11 | | ● | | ● | | | ● | 0.524 | - | |
| REV | ● | ● | | | ● | | | 4.298 | | |

PLANETARY GEAR TRAIN OF AUTOMATIC TRANSMISSION FOR VEHICLE

FIELD

The present disclosure relates to an automatic transmission for a vehicle. More particularly, the present disclosure relates to a planetary gear train of an automatic transmission for a vehicle that improves power delivery performance and fuel economy.

BACKGROUND

The statements in this section merely provide background information related to the present disclosure and may not constitute prior art.

Recently, increase of oil price has drawn the attention of the auto industry to develop a vehicle having high fuel efficiency.

As one approach, research for an automatic transmission has been made to provide better drivability and less fuel consumption by achieving more speed stages.

However, in the automatic transmission, as the number of speed stages increase, the number of internal components (particularly, planetary gear sets) increase, and as a result, a length of the transmission increases. Therefore, mountability, production cost, weight and power delivery efficiency may be deteriorated, in particular, in a case of a front wheel drive vehicle where an engine is laterally mounted.

Accordingly, development of a planetary gear train that improves efficiency with a small number of components may be provided in order to increase a fuel economy enhancement effect through the multiple speed stages.

In this aspect, in recent years, 8-speed automatic transmissions tend to be implemented and the research and development of a planetary gear train capable of implementing more speed stages has also been actively conducted.

However, a conventional 8-speed automatic transmission typically includes three to four planetary gear sets and five to six control elements (frictional elements). In this case, since the length of the automatic transmission increases, mountability in a front wheel drive vehicle may be deteriorated.

Recently, one planetary gear set is disposed above another planetary gear set, but structures of automatic transmissions to which parallel planetary gear sets is applied are very limited.

In another way, dog clutches instead of control elements of wet-type are used. However, shift feel can be undermined.

In addition, since a conventional 8-speed automatic transmission has gear ratio span of 6.5-7.5, we have discovered that improvement of power performance and fuel economy may be minimal.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for a vehicle having advantages of achieving at least ten forward speed stages and one reverse speed stage by disposing four planetary gear sets separately on an input shaft and an output shaft disposed in parallel to each other and apart from each other and combining the four planetary gear sets with two external gears and seven control elements. Therefore, power delivery performance and fuel consumption may be improved due to multiple speed stages, and mountability may be improved by shortening a length of the automatic transmission.

Another form of the present disclosure provides a planetary gear train of an automatic transmission for a vehicle having further advantages of setting optimal gear ratios by freely changing teeth numbers of external gears. Therefore, power delivery performance and fuel consumption may further improved.

A planetary gear train of an automatic transmission for a vehicle according to an exemplary form of the present disclosure may include: a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; an input shaft, the first, second, and third planetary gear sets being disposed at a radial outer of the input shaft; an output shaft disposed in parallel to the input shaft, the fourth planetary gear set being disposed at a radial outer of the outer shaft; a first shaft directly connected to the first rotation element; a second shaft directly connecting the second rotation element to the fourth rotation element and being connected to the input shaft; a third shaft directly connected to the third rotation element; a fourth shaft directly connected to the fifth rotation element; a fifth shaft directly connecting the sixth rotation element to the eighth rotation element; a sixth shaft directly connected to the seventh rotation element; a seventh shaft directly connected to the ninth rotation element; an eighth shaft directly connected to the tenth rotation element, the eighth shaft connected to one of the third and seventh shafts through a first transfer gear; a ninth shaft directly connected to the eleventh rotation element and the output shaft; and a tenth shaft directly connected to the twelfth rotation element, the tenth shaft connected to the other of the third and seventh shafts through a second transfer gear.

The first shaft may be selectively connected to a transmission housing, the fourth shaft may be selectively connected to the third shaft, the fifth shaft may be selectively connected to the transmission housing, the sixth shaft may be selectively connected to the first shaft or the second shaft, and the seventh shaft may be selectively connected to the fourth shaft.

The first, second, and third rotation elements of the first planetary gear set may be a first sun gear, a first planet carrier, and a first ring gear, respectively, and the fourth, fifth, and sixth rotation elements of the second planetary gear set may be a second sun gear, a second planet carrier, and a second ring gear, respectively. The seventh, eighth, and ninth rotation elements of the third planetary gear set may be a third sun gear, a third planet carrier, and a third ring gear, respectively, and the tenth, eleventh, and twelfth rotation elements of the fourth planetary gear set may be a fourth sun gear, a fourth planet carrier, and a fourth ring gear, respectively.

In some aspects, the eighth shaft may be connected to the third shaft through the second transfer gear, the tenth shaft may be connected to the seventh shaft through the first transfer gear, and the seventh and tenth shafts may be selectively connected to the transmission housing.

In one aspect, the planetary gear train may further include: a first clutch disposed between the second shaft and the sixth shaft; a second clutch disposed between the third shaft and the fourth shaft; a third clutch disposed between the fourth shaft and the seventh shaft; a fourth clutch disposed between the first shaft and the sixth shaft; a first brake disposed between the fifth shaft and the transmission housing; a second brake disposed between the seventh shaft and the transmission housing; and a third brake disposed between the first shaft and the transmission housing.

In another aspect, the planetary gear train may further include: a first clutch disposed between the second shaft and the sixth shaft; a second clutch disposed between the third shaft and the fourth shaft; a third clutch disposed between the fourth shaft and the seventh shaft; a fourth clutch disposed between the first shaft and the sixth shaft; a first brake disposed between the fifth shaft and the transmission housing; a second brake disposed between the tenth shaft and the transmission housing; and a third brake disposed between the first shaft and the transmission housing.

In some aspects, the eighth shaft may be connected to the seventh shaft through the first transfer gear, the seventh and eighth shafts may be selectively connected to the transmission housing, and the tenth shaft may be connected to the third shaft through the second transfer gear.

In one aspect, the planetary gear train may further include: a first clutch disposed between the second shaft and the sixth shaft; a second clutch disposed between the third shaft and the fourth shaft; a third clutch disposed between the fourth shaft and the seventh shaft; a fourth clutch disposed between the first shaft and the sixth shaft; a first brake disposed between the fifth shaft and the transmission housing; a second brake disposed between the seventh shaft and the transmission housing; and a third brake disposed between the first shaft and the transmission housing.

In another aspect, the planetary gear train may further include: a first clutch disposed between the second shaft and the sixth shaft; a second clutch disposed between the third shaft and the fourth shaft; a third clutch disposed between the fourth shaft and the seventh shaft; a fourth clutch disposed between the first shaft and the sixth shaft; a first brake disposed between the fifth shaft and the transmission housing; a second brake disposed between the eighth shaft and the transmission housing; a third brake disposed between the first shaft and the transmission housing.

A planetary gear train of an automatic transmission for a vehicle according to another exemplary form of the present disclosure may include: a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; an input shaft, the first, second, and third planetary gear sets being disposed at a radial outer of the input shaft; and an output shaft disposed in parallel to the input shaft, the fourth planetary gear set being disposed at a radial outer of the outer shaft, wherein the first rotation element is selectively connected to a transmission housing, the second rotation element is directly connected to the fourth rotation element and the input shaft, the sixth rotation element is directly connected to the eighth rotation element and is selectively connected to the transmission housing, the eleventh rotation element is directly connected to the output shaft, the third rotation element is connected to one of the tenth rotation element and the twelfth rotation element, and the ninth rotation element is connected to the other of the tenth rotation element and the twelfth rotation element and is selectively connected to the transmission housing.

The fourth rotation element may be selectively connected to the seventh rotation element, the third rotation element may be selectively connected to the fifth rotation element, the fifth rotation element may be selectively connected to the ninth rotation element, and the first rotation element may be selectively connected to the seventh rotation element.

The first, second, and third rotation elements of the first planetary gear set may be a first sun gear, a first planet carrier, and a first ring gear, respectively, and the fourth, fifth, and sixth rotation elements of the second planetary gear set may be a second sun gear, a second planet carrier, and a second ring gear, respectively. The seventh, eighth, and ninth rotation elements of the third planetary gear set may be a third sun gear, a third planet carrier, and a third ring gear, respectively, and the tenth, eleventh, and twelfth rotation elements of the fourth planetary gear set may be a fourth sun gear, a fourth planet carrier, and a fourth ring gear, respectively.

In some aspects, the ninth rotation element may be connected to the twelfth rotation element through a first transfer gear, and the third rotation element may be connected to the tenth rotation element through a second transfer gear.

In one aspect, the planetary gear train may further include: a first clutch selectively connecting the fourth rotation element to the seventh rotation element; a second clutch selectively connecting the third rotation element to the fifth rotation element; a third clutch selectively connecting the fifth rotation element to the ninth rotation element; a fourth clutch selectively connecting the first rotation element to the seventh rotation element; a first brake selectively connecting the eighth rotation element to the transmission housing; a second brake selectively connecting the ninth rotation element to the transmission housing; and a third brake selectively connecting the first rotation element to the transmission housing.

In another aspect, the planetary gear train may further include: a first clutch selectively connecting the fourth rotation element to the seventh rotation element; a second clutch selectively connecting the third rotation element to the fifth rotation element; a third clutch selectively connecting the fifth rotation element to the ninth rotation element; a fourth clutch selectively connecting the first rotation element to the seventh rotation element; a first brake selectively connecting the eighth rotation element to the transmission housing; a second brake selectively connecting the twelfth rotation element to the transmission housing; and a third brake selectively connecting the first rotation element to the transmission housing.

In some aspects, the ninth rotation element may be connected to the tenth rotation element through a first transfer gear, and the third rotation element may be connected to the twelfth rotation element through a second transfer gear.

In one aspect, the planetary gear train may further include: a first clutch selectively connecting the fourth rotation element to the seventh rotation element; a second clutch selectively connecting the third rotation element to the fifth rotation element; a third clutch selectively connecting the fifth rotation element to the ninth rotation element; a fourth clutch selectively connecting the first rotation element to the seventh rotation element; a first brake selectively connecting the eighth rotation element to the transmission housing; a second brake selectively connecting the ninth rotation element to the transmission housing; and a third brake selectively connecting the first rotation element to the transmission housing.

In another aspect, the planetary gear train may further include: a first clutch selectively connecting the fourth rotation element to the seventh rotation element; a second clutch selectively connecting the third rotation element to the fifth rotation element; a third clutch selectively connecting the fifth rotation element to the ninth rotation element; a fourth clutch selectively connecting the first rotation element to the seventh rotation element; a first brake selectively connecting the eighth rotation element to the transmission housing; a second brake selectively connecting the tenth rotation element to the transmission housing; and a third brake selectively connecting the first rotation element to the transmission housing.

According to the exemplary forms of the present disclosure, a length of the automatic transmission may be shortened and mountability may be improved by disposing four planetary gear sets on the input shaft and the output shaft disposed in parallel with each other and apart from each other.

Since two transfer gears in addition to the planetary gear sets are used according to the exemplary forms of the present disclosure, optimal gear ratios may be set. Therefore, gear ratios may be changed according to demanded performance condition, starting performance may be improved, and a starting clutch instead of a conventional torque converter may be used.

The planetary gear train according to the exemplary forms of the present disclosure can secure gear ratio span greater than approximately 9.0 as well as achieve at least ten forward speed stages and one reverse speed stage. Therefore, driving efficiency of the engine may be improved.

In addition, since linearity of step ratios can be secured due to multiple speed stages, drivability such as acceleration before and after shift, continuous and smooth engine speed changes, and so on may be improved.

Other effects obtainable or predictable from an exemplary form of the present disclosure will be explicitly or implicitly described in a DETAILED DESCRIPTION section.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Parts which are not related with the description are omitted for clearly describing the exemplary forms of the present disclosure.

In the following description, dividing names of components into first, second, and the like is to divide the names because the names of the components are the same as each other and an order thereof is not particularly limited.

Figure 1:
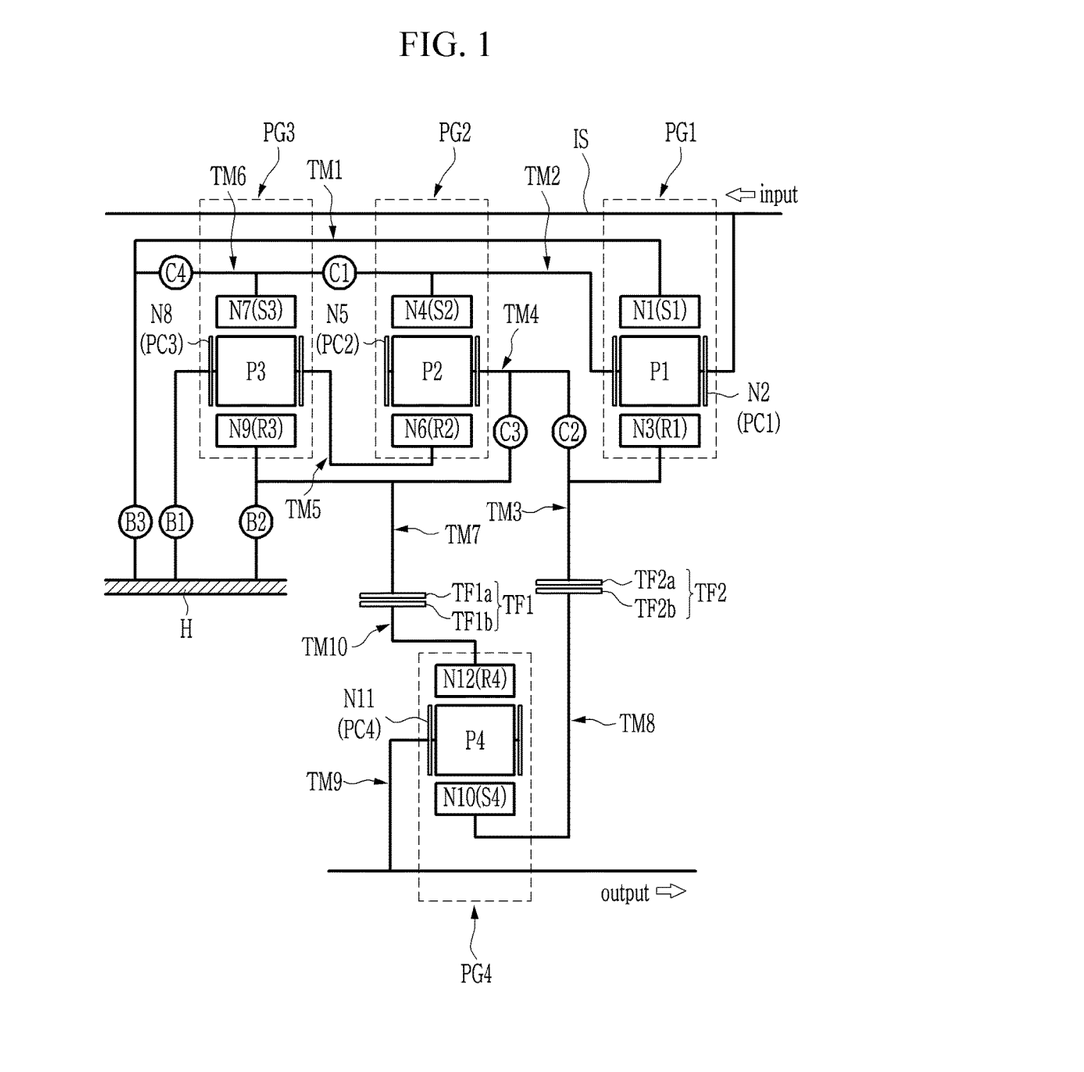
FIG. 1 is a schematic diagram of a planetary gear train according to the first exemplary form of the present disclosure.

FIG. 1 is a schematic diagram of a planetary gear train in a first exemplary form of the present disclosure.

Referring to FIG. 1, a planetary gear train includes: an input shaft IS; an output shaft OS; first, second, third, and fourth planetary gear sets (PG1, PG2, PG3, and PG4); two transfer gears (TF1 and TF2); and control elements including four clutches (C1, C2, C3, and C4) and three brakes (B1, B2, and B3).

The input shaft IS is an input member receiving torque from a crankshaft of an engine, after being torque-converted through a torque converter.

The output shaft OS is an output member, which is disposed in parallel with and apart from the input shaft IS, and transmits driving torque to a driving wheel through a differential apparatus.

The first, second, and third planetary gear set PG1, PG2, and PG3 are disposed at a radial outer of the input shaft IS and embody a main shifting portion. The fourth planetary gear set PG4 is disposed at a radial outer of the output shaft OS disposed in parallel with and apart from the input shaft IS and embodies an auxiliary shifting portion.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

The second rotation element N2 is directly connected with the fourth rotation element N4 and the sixth rotation element N6 is directly connected with the eighth rotation element N8 such that the first, second, and third planetary gear sets PG1, PG2, and PG3 include seven shafts TM1 to TM7.

The rotation elements of the fourth planetary gear set PG4 operate independently from each other and embody three shafts TM8 to TM10.

The ten shafts TM1 to TM10 will be described in detail.

The first shaft TM1 is directly connected to the first rotation element N1 (first sun gear S1) and is selectively connected to the transmission housing H so as to be operated as a selective fixed element.

The second shaft TM2 directly connects the second rotation element N2 (first planet carrier PC1) to the fourth rotation element N4 (second sun gear S2), and is connected to the input shaft IS.

The third shaft TM3 is directly connected to the third rotation element N3 (first ring gear R1).

The fourth shaft TM4 is directly connected to the fifth rotation element N5 (second planet carrier PC2) and is selectively connected to the third shaft TM3.

The fifth shaft TM5 directly connects the sixth rotation element N6 (second ring gear R2) to the eighth rotation element N8 (third planet carrier PC3), and is selectively connected to the transmission housing H so as to be operated as a selective fixed element.

The sixth shaft TM6 is directly connected to the seventh rotation element N7 (third sun gear S3) and is selectively connected to the first shaft TM1 or the second shaft TM2.

The seventh shaft TM7 is directly connected to the ninth rotation element N9 (third ring gear R3), is selectively connected to the fourth shaft TM4, and is selectively connected with the transmission housing H so as to be operated as a selective fixed element.

The eighth shaft TM8 is directly connected to the tenth rotation element N10 (fourth sun gear S4) and is connected to the third shaft TM3 through an external gear.

The ninth shaft TM9 is directly connected to the eleventh rotation element N11 (fourth planet carrier PC4) and is also directly connected to the output shaft OS so as to be continuously operated as an output element.

The tenth shaft TM9 is directly connected to the twelfth rotation element N12 (fourth ring gear R4) and is connected to the seventh shaft TM7 through another external gear.

The two transfer gears (i.e., TF1 and TF2) transmit torque changed by the first, second, and third planetary gear sets PG1, PG2, and PG3 forming the main shifting portion to the fourth planetary gear set PG4 forming the auxiliary shifting portion as an inverse rotation speed according to gear ratios of the two transfer gears TF1 and TF2.

The first transfer gear TF1 includes a first transfer drive gear TF1a directly connected with the seventh shaft TM7 and a first transfer driven gear TF1b directly connected with the tenth shaft TM10. Therefore, the first transfer gear TF1 connects the seventh shaft TM7 with the tenth shaft TM10. The seventh shaft TM7 and the tenth shaft TM10 connected by the first transfer gear TF1 rotate in opposite directions with each other.

The second transfer gear TF2 includes a second transfer drive gear TF2a directly connected with the third shaft TM3 and a second transfer driven gear TF2b directly connected with the eighth shaft TM8. Therefore, the second transfer gear TF2 connects the third shaft TM3 with the eighth shaft TM8. The third shaft TM3 and the eighth shaft TM8 connected by the second transfer gear TF2 rotate in opposite directions to each other.

The gear ratios of the first and second transfer gears TF1 and TF2 can be set according to gear ratios demanded at each speed stages.

Arrangement of the control elements including the four clutches C1, C2, C3, and C4 and the three brakes B1, B2, and B3 will be described in detail.

The first clutch C1 is disposed between the second shaft TM2 and the sixth shaft TM6 and selectively connects the second shaft TM2 with the sixth shaft TM6.

The second clutch C2 is disposed between the third shaft TM3 and the fourth shaft TM4 and selectively connects the third shaft TM3 with the fourth shaft TM4.

The third clutch C3 is disposed between the fourth shaft TM4 and the seventh shaft TM7 and selectively connects the fourth shaft TM4 with the seventh shaft TM7.

The fourth clutch C4 is disposed between the first shaft TM1 and the sixth shaft TM6 and selectively connects the first shaft TM1 with the sixth shaft TM6.

The first brake B1 is disposed between the fifth shaft TM5 and the transmission housing H and selectively connects the fifth shaft TM5 with the transmission housing H to be operated as the selective fixed element.

The second brake B2 is disposed between the seventh shaft TM7 and the transmission housing H and selectively connects the seventh shaft TM7 with the transmission housing H to be operated as the selective fixed element.

The third brake B3 is disposed between the first shaft TM1 and the transmission housing H and selectively connects the first shaft TM1 with the transmission housing H to be operated as the selective fixed element.

The control elements including the first, second, third, and fourth clutches C1, C2, C3, and C4 and the first, second, and third brakes B1, B2, and B3 may be multi-plates friction elements of wet type that are operated by hydraulic pressure.

Figure 2:
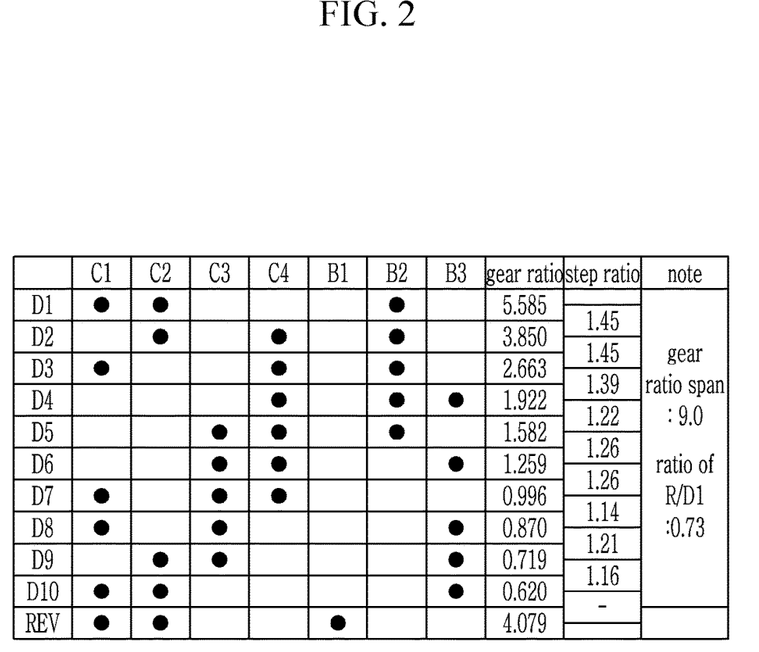
FIG. 2 is one example of an operation chart of control elements at each speed stage in the planetary gear train according to the first exemplary form of the present disclosure.

FIG. 2 is one example of an operation chart of control elements at each speed stage in the planetary gear train according to the first exemplary form of the present disclosure.

As shown in FIG. 2, three control elements among the first, second, third, and fourth clutches C1, C2, C3, and C4 and the first, second, and third brakes B1, B2, and B3 are operated at each speed stage in the planetary gear train according to the first exemplary form of the present disclosure.

First Forward Speed Stage:

The first and second clutches C1 and C2 and the second brake B2 are operated at a first forward speed stage D1.

In a state that the second shaft TM2 is connected with the sixth shaft TM6 by operation of the first clutch C1 and the third shaft TM3 is connected with the fourth shaft TM4 by operation of the second clutch C2, torque of the input shaft IS is input into the second shaft TM2. In addition, the seventh shaft TM7 is operated as the fixed element by operation of the second brake B2. Therefore, the torque of the input shaft IS is shifted into the first forward speed stage, and the first forward speed stage is output through the output shaft OS connected with the ninth shaft TM9.

Second Forward Speed Stage:

The second and fourth clutches C2 and C4 and the second brake B2 are operated at a second forward speed stage D2.

In a state that the third shaft TM3 is connected with the fourth shaft TM4 by operation of the second clutch C2 and the first shaft TM1 is connected with the sixth shaft TM6 by operation of the fourth clutch C4, the torque of the input shaft IS is input into the second shaft TM2. In addition, the seventh shaft TM7 is operated as the fixed element by operation of the second brake B2. Therefore, the torque of the input shaft IS is shifted into the second forward speed stage, and the second forward speed stage is output through the output shaft OS connected with the ninth shaft TM9.

Third Forward Speed Stage:

The first and fourth clutches C1 and C4 and the second brake B2 are operated at a third forward speed stage D3.

In a state that the second shaft TM2 is connected with the sixth shaft TM6 by operation of the first clutch C1 and the first shaft TM1 is connected with the sixth shaft TM6 by operation of the fourth clutch C4, the torque of the input shaft IS is input into the second shaft TM2. In addition, the seventh shaft TM7 is operated as the fixed element by operation of the second brake B2. Therefore, the torque of the input shaft IS is shifted into the third forward speed stage, and the third forward speed stage is output through the output shaft OS connected with the ninth shaft TM9.

Fourth Forward Speed Stage:

The fourth clutch C4 and the second and third brakes B2 and B3 are operated at a fourth forward speed stage D4.

In a state that the first shaft TM1 is connected with the sixth shaft TM6 by operation of the fourth clutch C4, the torque of the input shaft IS is input into the second shaft TM2. In addition, the seventh shaft TM7 and the first shaft TM1 are operated as the fixed elements by operation of the second and third brakes B2 and B3. Therefore, the torque of the input shaft IS is shifted into the fourth forward speed stage, and the fourth forward speed stage is output through the output shaft OS connected with the ninth shaft TM9.

Fifth Forward Speed Stage:

The third and fourth clutches C3 and C4 and the second brake B2 are operated at a fifth forward speed stage D5.

In a state that the fourth shaft TM4 is connected with the seventh shaft TM7 by operation of the third clutch C3 and the first shaft TM1 is connected with the sixth shaft TM6 by operation of the fourth clutch C4, the torque of the input shaft IS is input into the second shaft TM2. In addition, the seventh shaft TM7 is operated as the fixed element by operation of the second brake B2. Therefore, the torque of the input shaft IS is shifted into the fifth forward speed stage, and the fifth forward speed stage is output through the output shaft OS connected with the ninth shaft TM9.

Sixth Forward Speed Stage:

The third and fourth clutches C3 and C4 and the third brake B3 are operated at a sixth forward speed stage D6.

In a state that the fourth shaft TM4 is connected with the seventh shaft TM7 by operation of the third clutch C3 and the first shaft TM1 is connected with the sixth shaft TM6 by operation of the fourth clutch C4, the torque of the input shaft IS is input into the second shaft TM2. In addition, the first shaft TM1 is operated as the fixed element by operation of the third brake B3. Therefore, the torque of the input shaft IS is shifted into the sixth forward speed stage, and the sixth forward speed stage is output through the output shaft OS connected with the ninth shaft TM9.

Seventh Forward Speed Stage:

The first, third, and fourth clutches C1, C3, and C4 are operated at a seventh forward speed stage D7.

In a state that the second shaft TM2 is connected with the sixth shaft TM6 by operation of the first clutch C1, the fourth shaft TM4 is connected with the seventh shaft TM7 by operation of the third clutch C3, and the first shaft TM1 is connected with the sixth shaft TM6 by operation of the fourth clutch C4, the torque of the input shaft IS is input into the second shaft TM2. Therefore, the torque of the input shaft IS is output through the output shaft OS connected with the ninth shaft TM9 without rotation speed being changed.

Eighth Forward Speed Stage:

The first and third clutches C1 and C3 and the third brake B3 are operated at an eighth forward speed stage D8.

In a state that the second shaft TM2 is connected with the sixth shaft TM6 by operation of the first clutch C1 and the fourth shaft TM4 is connected with the seventh shaft TM7 by operation of the third clutch C3, the torque of the input shaft IS is input into the second shaft TM2. In addition, the first shaft TM1 is operated as the fixed element by operation of the third brake B3. Therefore, the torque of the input shaft IS is shifted into the eighth forward speed stage, and the eighth forward speed stage is output through the output shaft OS connected with the ninth shaft TM9.

Ninth Forward Speed Stage:

The second and third clutches C2 and C3 and the third brake B3 are operated at a ninth forward speed stage D9.

In a state that the third shaft TM3 is connected with the fourth shaft TM4 by operation of the second clutch C2 and the fourth shaft TM4 is connected with the seventh shaft TM7 by operation of the third clutch C3, the torque of the input shaft IS is input into the second shaft TM2. In addition, the first shaft TM1 is operated as the fixed element by operation of the third brake B3. Therefore, the torque of the input shaft IS is shifted into the ninth forward speed stage, and the ninth forward speed stage is output through the output shaft OS connected with the ninth shaft TM9.

Tenth Forward Speed Stage:

The first and second clutches C1 and C2 and the third brake B3 are operated at a tenth forward speed stage D10.

In a state that the second shaft TM2 is connected with the sixth shaft TM6 by operation of the first clutch C1 and the third shaft TM3 is connected with the fourth shaft TM4 by operation of the second clutch C2, the torque of the input shaft IS is input into the second shaft TM2. In addition, the first shaft TM1 is operated as the fixed element by operation of the third brake B3. Therefore, the torque of the input shaft IS is shifted into the tenth forward speed stage, and the tenth forward speed stage is output through the output shaft OS connected with the ninth shaft TM9.

Reverse Speed Stage:

The first and second clutches C1 and C2 and the first brake B1 are operated at a reverse speed stage REV.

In a state that the second shaft TM2 is connected with the sixth shaft TM6 by operation of the first clutch C1 and the third shaft TM3 is connected with the fourth shaft TM4 by operation of the second clutch C2, the torque of the input shaft IS is input into the second shaft TM2. In addition, the fifth shaft TM5 is operated as the fixed element by operation of the first brake B1. Therefore, the torque of the input shaft IS is shifted into the reverse speed stage, and the reverse speed stage is output through the output shaft OS connected with the ninth shaft TM9.

The gear ratios at each speed stage illustrated in FIG. 2 are calculated by assuming that a gear ratio of first ring gear R1/first sun gear S1 is approximately 2.59, a gear ratio of second ring gear R2/second sun gear S2 is approximately 3.81, a gear ratio of third ring gear R3/third sun gear S3 is approximately 1.95, gear ratio of fourth ring gear R4/fourth sun gear S4 is approximately 1.89, a gear ratio of first transfer driven gear TF1b/first transfer drive gear TF1a is approximately 2.04, and a gear ratio of second transfer driven gear TF2b/second transfer drive gear TF2a is approximately 1.92.

Figure 3:
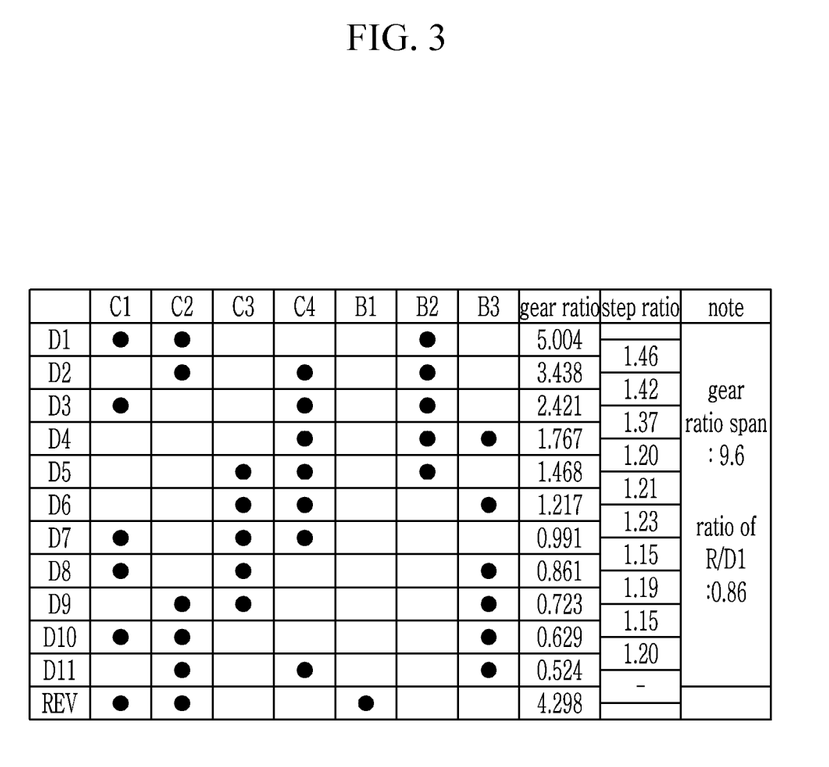
FIG. 3 is another example of an operation chart of control elements at each speed stage in the planetary gear train according to the first exemplary form of the present disclosure.

FIG. 3 is another example of an operation chart of control elements at each speed stage in the planetary gear train according to the first exemplary form of the present disclosure.

Referring to FIG. 3, the planetary gear train can achieve one reverse speed stage and eleven forward speed stages by operating three control elements among the first, second, third, and fourth clutches C1, C2, C3, and C4 and the first, second, and third brake B1, B2, and B3.

That is, the planetary gear train according to the first exemplary form of the present disclosure can further achieve an eleventh forward speed stage D11 by operating the second and fourth clutches C2 and C4 and the third brake B3 in addition to the ten forward speed stages illustrated in FIG. 2.

Since shifting processes from the first forward speed stage D1 to the tenth forward speed stage D10 are the same as the above-described shifting processes, detailed description thereof will be omitted.

As shown in FIG. 3, the second and fourth clutches C2 and C4 and the third brake B3 are operated at the eleventh forward speed stage D11.

In a state that the third shaft TM3 is connected with the fourth shaft TM4 by operation of the second clutch C2 and the first shaft TM1 is connected with the sixth shaft TM6 by operation of the fourth clutch C4, the torque of the input shaft IS is input into the second shaft TM2. In addition, the first shaft TM1 is operated as the fixed element by operation of the third brake B3. Therefore, the torque of the input shaft IS is shifted into the eleventh forward speed stage, and the eleventh forward speed stage is output through the output shaft OS connected with the ninth shaft TM9.

The gear ratios at each speed stage illustrated in FIG. 3 are calculated by assuming that a gear ratio of first ring gear R1/first sun gear S1 is approximately 2.70, a gear ratio of second ring gear R2/second sun gear S2 is approximately 3.81, a gear ratio of third ring gear R3/third sun gear S3 is approximately 1.87, a gear ratio of fourth ring gear R4/fourth sun gear S4 is approximately 1.63, a gear ratio of first transfer driven gear TF1b/first transfer drive gear TF1a is approximately 2.04, and a gear ratio of second transfer driven gear TF2b/second transfer drive gear TF2a is approximately 1.92.

Figure 4:
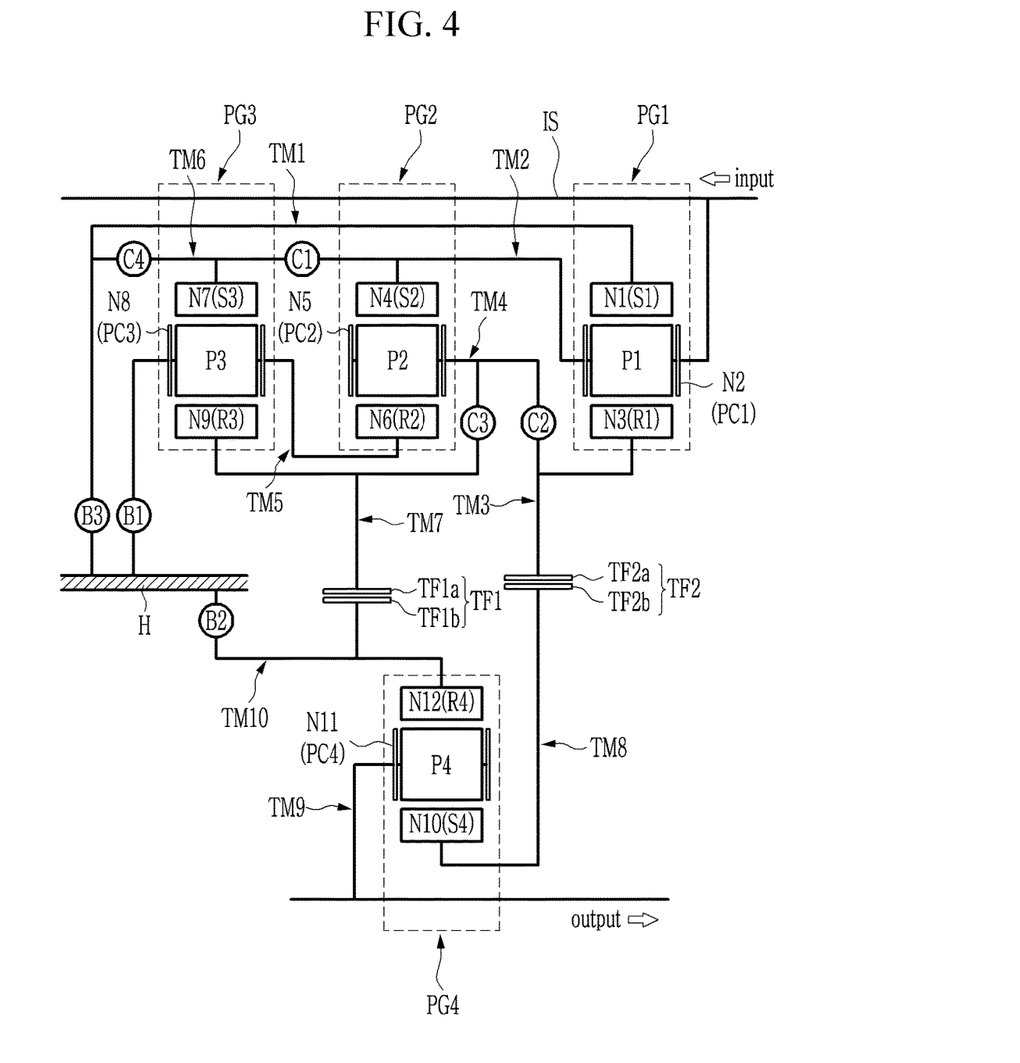
FIG. 4 is a schematic diagram of a planetary gear train according to a second exemplary form of the present disclosure.

FIG. 4 is a schematic diagram of a planetary gear train according to the second exemplary form of the present disclosure.

The second brake B2 is disposed between the seventh shaft TM7 and the transmission housing H in the planetary gear train according to the first exemplary form of the present disclosure, but as shown in FIG. 4, the second brake B2 is disposed between the tenth shaft TM10 and the transmission housing H in the planetary gear train according to the second exemplary form of the present disclosure.

The seventh shaft TM7 and the tenth shaft TM10 connected thereto through the first transfer gear TF1 are operated as the fixed elements when the second brake B2 operates in the planetary gear train according to the first exemplary form, but the tenth shaft TM10 and the seventh shaft TM7 connected thereto through the first transfer gear TF1 are operated as the fixed elements when the second brake B2 operates in the planetary gear train according to the second exemplary form.

Since operation and shifting processes of the second exemplary form are the same as those of the first exemplary form except a position of the second brake B2, detailed description thereof will be omitted.

Figure 5:
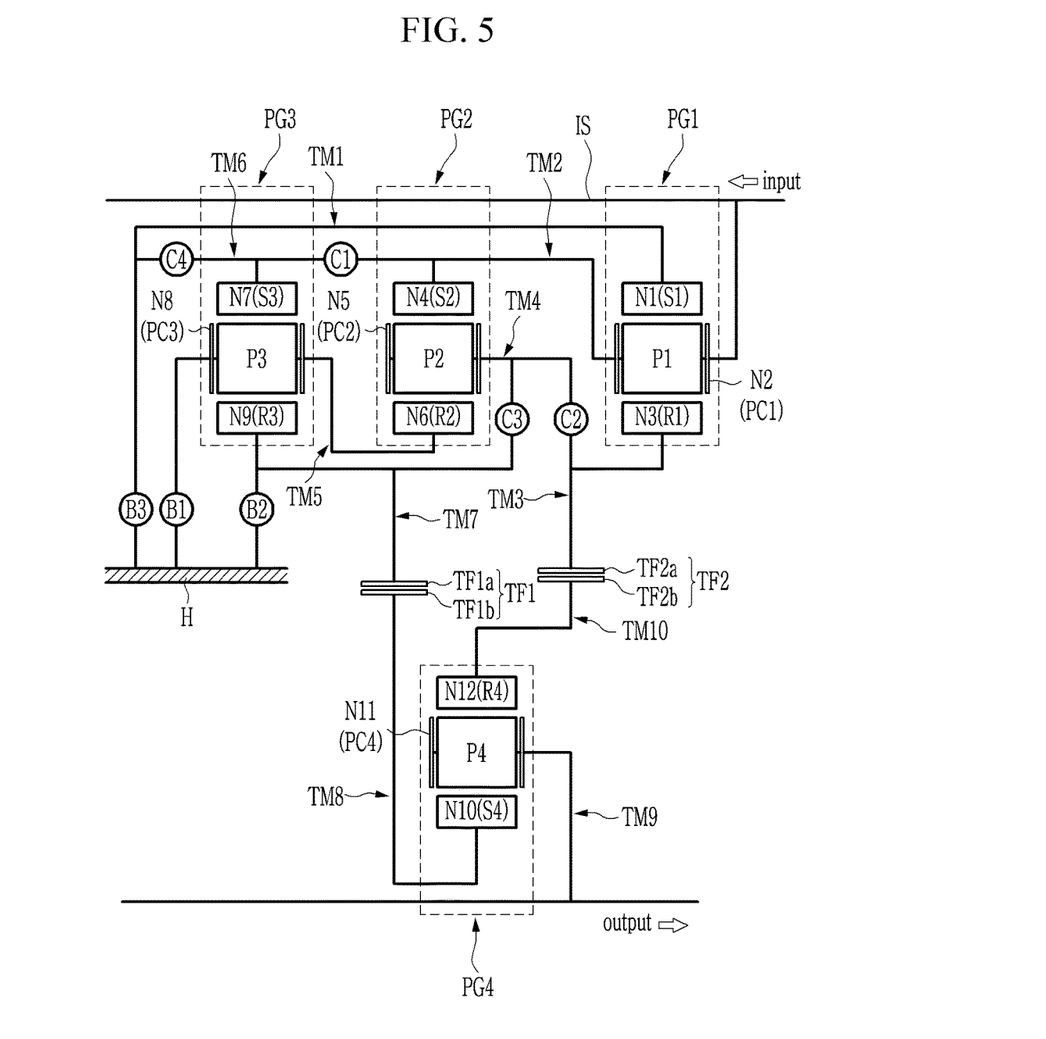
FIG. 5 is a schematic diagram of a planetary gear train according to a third exemplary form of the present disclosure.

FIG. 5 is a schematic diagram of a planetary gear train according to the third exemplary form of the present disclosure.

The seventh shaft TM7 is connected with the tenth shaft TM10 through the first transfer gear TF1 and the third shaft TM3 is connected with the eighth shaft TM8 through the second transfer gear TF2 in the planetary gear train according to the first exemplary form of the present disclosure, but as shown in FIG. 5, the seventh shaft TM7 is connected with the eighth shaft TM8 through the first transfer gear TF1 and the third shaft TM3 is connected with the tenth shaft TM10 through the second transfer gear TF2 according to the third exemplary form.

Compared with the first exemplary form, rotation speed output through the seventh shaft TM7 and the third shaft TM3 is changed according to the third exemplary form, but operation and shifting processes of the third exemplary form are the same as those of the first exemplary form. Therefore, detailed description thereof will be omitted.

Figure 6:
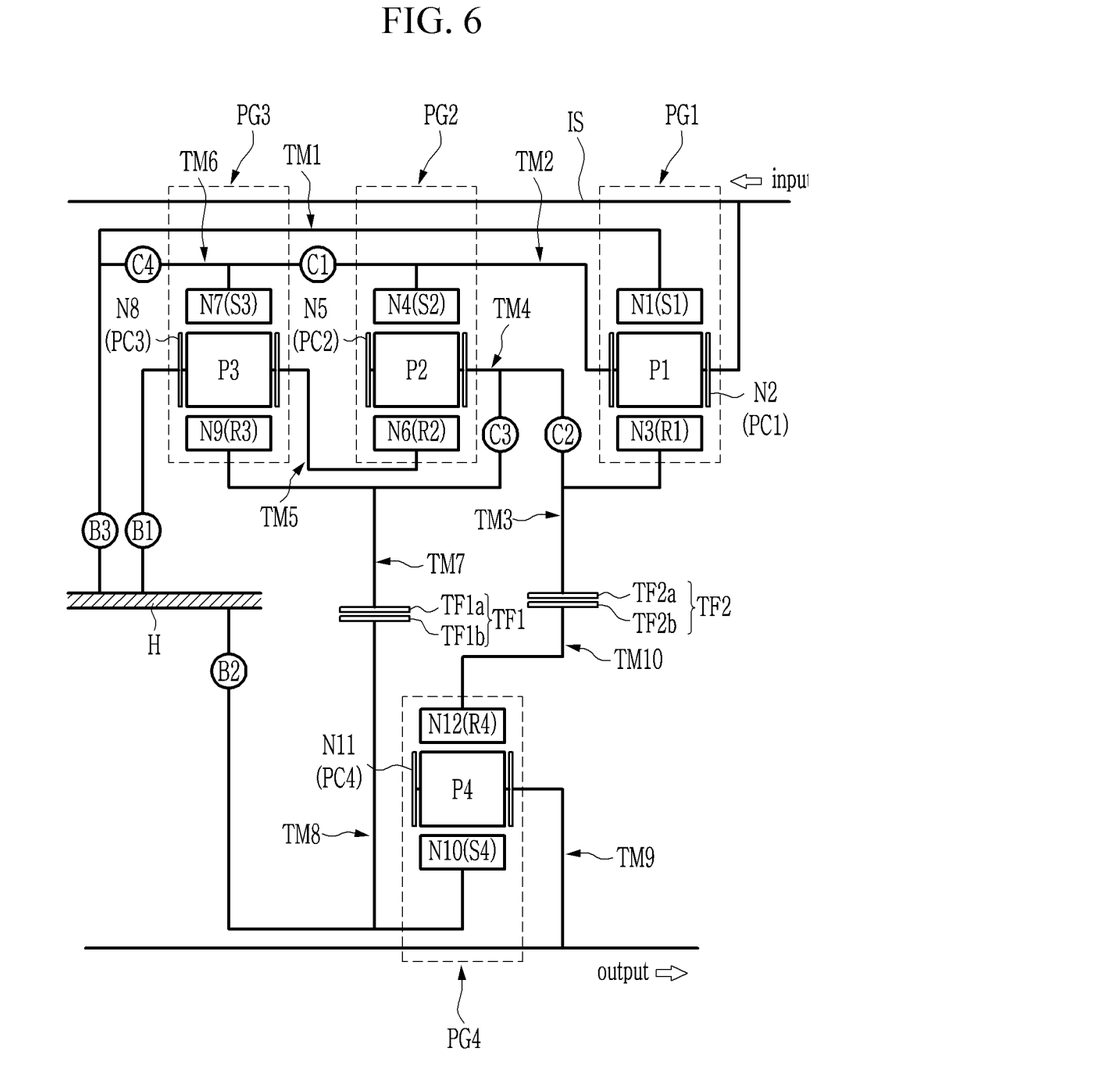
FIG. 6 is a schematic diagram of a planetary gear train according to a fourth exemplary form of the present disclosure.

FIG. 6 is a schematic diagram of a planetary gear train according to the fourth exemplary form of the present disclosure.

The second brake B2 is disposed between the seventh shaft TM7 and the transmission housing H in the planetary gear train according to the third exemplary form of the present disclosure, but as shown in FIG. 6, the second brake B2 is disposed between the eighth shaft TM8 and the transmission housing H in the planetary gear train according to the fourth exemplary form.

The seventh shaft TM7 and the eighth shaft TM8 connected thereto through the first transfer gear TF1 are operated as the fixed elements when the second brake B2 operates in the planetary gear train according to the third exemplary form, but the eighth shaft TM10 and the seventh shaft TM7 connected thereto through the first transfer gear TF1 are operated as the fixed elements when the second brake B2 operates in the planetary gear train according to the fourth exemplary form.

Since operation and shifting processes of the fourth exemplary form are the same as those of the third exemplary form except a position of the second brake B2, detailed description thereof will be omitted.

The planetary gear train according to the exemplary forms of the present disclosure can achieve at least ten forward speed stages and one reverse speed stage by disposing the four planetary gear sets PG1, PG2, PG3, and PG4 separately on the input shaft and the output shaft disposed in parallel with and apart from each other, and combining the four planetary gear sets PG1, PG2, PG3, and PG4 with the two transfer gears TF1 and TF2, the four clutches C1, C2, C3, and C4, and the three brakes B1, B2, and B3. Therefore, power delivery performance and fuel consumption may be improved, and mountability may be improved by shortening a length of the automatic transmission.

Since teeth numbers of the two transfer gears can be freely changed in the planetary gear train according to the exemplary forms of the present disclosure, optimal gear ratios may be set. Therefore, gear ratios may be changed according to demanded performance condition, starting performance may be improved, and a starting clutch instead of a conventional torque converter may be used.

The planetary gear train according to the exemplary forms of the present disclosure can secure gear ratio span greater than approximately 9.0 as well as achieve at least ten forward speed stages and one reverse speed stage. Therefore, driving efficiency of the engine may be improved.

In addition, since linearity of step ratios can be secured due to multiple speed stages, drivability such as acceleration before and after shift, rhythmical engine speed, and so on may be improved.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A planetary gear train of an automatic transmission for a vehicle, comprising:
    a first planetary gear set including first, second, and third rotation elements;
    a second planetary gear set including fourth, fifth, and sixth rotation elements;
    a third planetary gear set including seventh, eighth, and ninth rotation elements;
    a fourth planetary gear set including tenth, eleventh, and twelfth rotation elements;
    an input shaft, the first, second, and third planetary gear sets being disposed at a radial outer of the input shaft;
    an output shaft disposed in parallel to the input shaft, the fourth planetary gear set being disposed at a radial outer of the outer shaft;
    a first shaft directly connected to the first rotation element;
    a second shaft directly connecting the second rotation element to the fourth rotation element and being connected to the input shaft;
    a third shaft directly connected to the third rotation element;
    a fourth shaft directly connected to the fifth rotation element;
    a fifth shaft directly connecting the sixth rotation element to the eighth rotation element;
    a sixth shaft directly connected to the seventh rotation element;
    a seventh shaft directly connected to the ninth rotation element;
    an eighth shaft directly connected to the tenth rotation element, the eighth shaft connected to one of the third and seventh shafts through a first transfer gear;
    a ninth shaft directly connected to the eleventh rotation element and the output shaft; and
    a tenth shaft directly connected to the twelfth rotation element, the tenth shaft connected to the other of the third and seventh shafts through a second transfer gear.

2. The planetary gear train of claim 1, wherein the first shaft is selectively connected to a transmission housing,
    the fourth shaft is selectively connected to the third shaft,
    the fifth shaft is selectively connected to the transmission housing,
    the sixth shaft is selectively connected to the first shaft or the second shaft, and
    the seventh shaft is selectively connected to the fourth shaft.

3. The planetary gear train of claim 1, wherein the first, second, and third rotation elements of the first planetary gear set are a first sun gear, a first planet carrier, and a first ring gear, respectively,
    the fourth, fifth, and sixth rotation elements of the second planetary gear set are a second sun gear, a second planet carrier, and a second ring gear, respectively,
    the seventh, eighth, and ninth rotation elements of the third planetary gear set are a third sun gear, a third planet carrier, and a third ring gear, respectively, and
    the tenth, eleventh, and twelfth rotation elements of the fourth planetary gear set are a fourth sun gear, a fourth planet carrier, and a fourth ring gear, respectively.

4. The planetary gear train of claim 2, wherein the eighth shaft is connected to the third shaft through the second transfer gear, and
    the tenth shaft is connected to the seventh shaft through the first transfer gear, and the seventh and tenth shafts are selectively connected to the transmission housing.

5. The planetary gear train of claim 4, further comprising:
    a first clutch disposed between the second shaft and the sixth shaft;
    a second clutch disposed between the third shaft and the fourth shaft;
    a third clutch disposed between the fourth shaft and the seventh shaft;
    a fourth clutch disposed between the first shaft and the sixth shaft;
    a first brake disposed between the fifth shaft and the transmission housing;
    a second brake disposed between the seventh shaft and the transmission housing; and
    a third brake disposed between the first shaft and the transmission housing.

6. The planetary gear train of claim 4, further comprising:
    a first clutch disposed between the second shaft and the sixth shaft;
    a second clutch disposed between the third shaft and the fourth shaft;
    a third clutch disposed between the fourth shaft and the seventh shaft;
    a fourth clutch disposed between the first shaft and the sixth shaft;
    a first brake disposed between the fifth shaft and the transmission housing;
    a second brake disposed between the tenth shaft and the transmission housing; and
    a third brake disposed between the first shaft and the transmission housing.

7. The planetary gear train of claim 2, wherein the eighth shaft is connected to the seventh shaft through the first transfer gear, and the seventh and eighth shafts are selectively connected to the transmission housing, and
    the tenth shaft is connected to the third shaft through the second transfer gear.

8. The planetary gear train of claim 7, further comprising:
    a first clutch disposed between the second shaft and the sixth shaft;
    a second clutch disposed between the third shaft and the fourth shaft;
    a third clutch disposed between the fourth shaft and the seventh shaft;
    a fourth clutch disposed between the first shaft and the sixth shaft;
    a first brake disposed between the fifth shaft and the transmission housing;
    a second brake disposed between the seventh shaft and the transmission housing; and
    a third brake disposed between the first shaft and the transmission housing.

9. The planetary gear train of claim 7, further comprising:
a first clutch disposed between the second shaft and the sixth shaft;
a second clutch disposed between the third shaft and the fourth shaft;
a third clutch disposed between the fourth shaft and the seventh shaft;
a fourth clutch disposed between the first shaft and the sixth shaft;
a first brake disposed between the fifth shaft and the transmission housing;
a second brake disposed between the eighth shaft and the transmission housing;
a third brake disposed between the first shaft and the transmission housing.

10. The planetary gear train of claim 1, wherein the second rotation element is directly connected to the input shaft.

11. A planetary gear train of an automatic transmission for a vehicle, comprising:
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
an input shaft, the first, second, and third planetary gear sets being disposed at a radial outer of the input shaft; and
an output shaft disposed in parallel to the input shaft, the fourth planetary gear set being disposed at a radial outer of the outer shaft,
wherein the first rotation element is selectively connected to a transmission housing,
the second rotation element is directly connected to the fourth rotation element and the input shaft,
the sixth rotation element is directly connected to the eighth rotation element and is selectively connected to the transmission housing,
the eleventh rotation element is directly connected to the output shaft,
the third rotation element is connected to one of the tenth rotation element and the twelfth rotation element, and
the ninth rotation element is connected to the other of the tenth rotation element and the twelfth rotation element and is selectively connected to the transmission housing.

12. The planetary gear train of claim 11, wherein the fourth rotation element is selectively connected to the seventh rotation element,
the third rotation element is selectively connected to the fifth rotation element,
the fifth rotation element is selectively connected to the ninth rotation element, and
the first rotation element is selectively connected to the seventh rotation element.

13. The planetary gear train of claim 11, wherein the first, second, and third rotation elements of the first planetary gear set are a first sun gear, a first planet carrier, and a first ring gear, respectively,
the fourth, fifth, and sixth rotation elements of the second planetary gear set are a second sun gear, a second planet carrier, and a second ring gear, respectively,
the seventh, eighth, and ninth rotation elements of the third planetary gear set are a third sun gear, a third planet carrier, and a third ring gear, respectively, and
the tenth, eleventh, and twelfth rotation elements of the fourth planetary gear set are a fourth sun gear, a fourth planet carrier, and a fourth ring gear, respectively.

14. The planetary gear train of claim 12, wherein the ninth rotation element is connected to the twelfth rotation element through a first transfer gear, and the third rotation element is connected to the tenth rotation element through a second transfer gear.

15. The planetary gear train of claim 14, further comprising:
a first clutch selectively connecting the fourth rotation element to the seventh rotation element;
a second clutch selectively connecting the third rotation element to the fifth rotation element;
a third clutch selectively connecting the fifth rotation element to the ninth rotation element;
a fourth clutch selectively connecting the first rotation element to the seventh rotation element;
a first brake selectively connecting the eighth rotation element to the transmission housing;
a second brake selectively connecting the ninth rotation element to the transmission housing; and
a third brake selectively connecting the first rotation element to the transmission housing.

16. The planetary gear train of claim 14, further comprising:
a first clutch selectively connecting the fourth rotation element to the seventh rotation element;
a second clutch selectively connecting the third rotation element to the fifth rotation element;
a third clutch selectively connecting the fifth rotation element to the ninth rotation element;
a fourth clutch selectively connecting the first rotation element to the seventh rotation element;
a first brake selectively connecting the eighth rotation element to the transmission housing;
a second brake selectively connecting the twelfth rotation element to the transmission housing; and
a third brake selectively connecting the first rotation element to the transmission housing.

17. The planetary gear train of claim 12, wherein the ninth rotation element is connected to the tenth rotation element through a first transfer gear, and the third rotation element is connected to the twelfth rotation element through a second transfer gear.

18. The planetary gear train of claim 17, further comprising:
a first clutch selectively connecting the fourth rotation element to the seventh rotation element;
a second clutch selectively connecting the third rotation element to the fifth rotation element;
a third clutch selectively connecting the fifth rotation element to the ninth rotation element;
a fourth clutch selectively connecting the first rotation element to the seventh rotation element;
a first brake selectively connecting the eighth rotation element to the transmission housing;
a second brake selectively connecting the ninth rotation element to the transmission housing; and
a third brake selectively connecting the first rotation element to the transmission housing.

19. The planetary gear train of claim 17, further comprising:

a first clutch selectively connecting the fourth rotation element to the seventh rotation element;
a second clutch selectively connecting the third rotation element to the fifth rotation element;
a third clutch selectively connecting the fifth rotation element to the ninth rotation element;
a fourth clutch selectively connecting the first rotation element to the seventh rotation element;
a first brake selectively connecting the eighth rotation element to the transmission housing;
a second brake selectively connecting the tenth rotation element to the transmission housing; and
a third brake selectively connecting the first rotation element to the transmission housing.

\* \* \* \* \*